United States Patent Office 3,479,508
Patented Nov. 18, 1969

3,479,508
PROCESS AND APPARATUS FOR ANALYSIS OF NEUTRON ACTIVATION OF AN ELEMENT IN LIQUID SAMPLES
Dominique Comar, Eures-sur-Yvette, and Claude Le Poec, Orsay, Essonne, France, assignors to Commissariat a l'Energie Atomique, Paris, France
Filed Apr. 14, 1966, Ser. No. 542,608
Claims priority, application France, Apr. 22, 1965, 14,129
Int. Cl. H01j 39/00; G21h 5/00
U.S. Cl. 250—83
7 Claims

ABSTRACT OF THE DISCLOSURE

The radioactivity of a halogen element present in samples is determined by a separate extraction of a halogen element from each irradiated sample. A volume of the extracted halogen element is accumulated and moved into a loop. A counter adjacent the loop measures the activity of the sample while in the loop and thereafter the next accumulated sample passes through the loop and the preceding sample is discharged.

---

Figure 1:
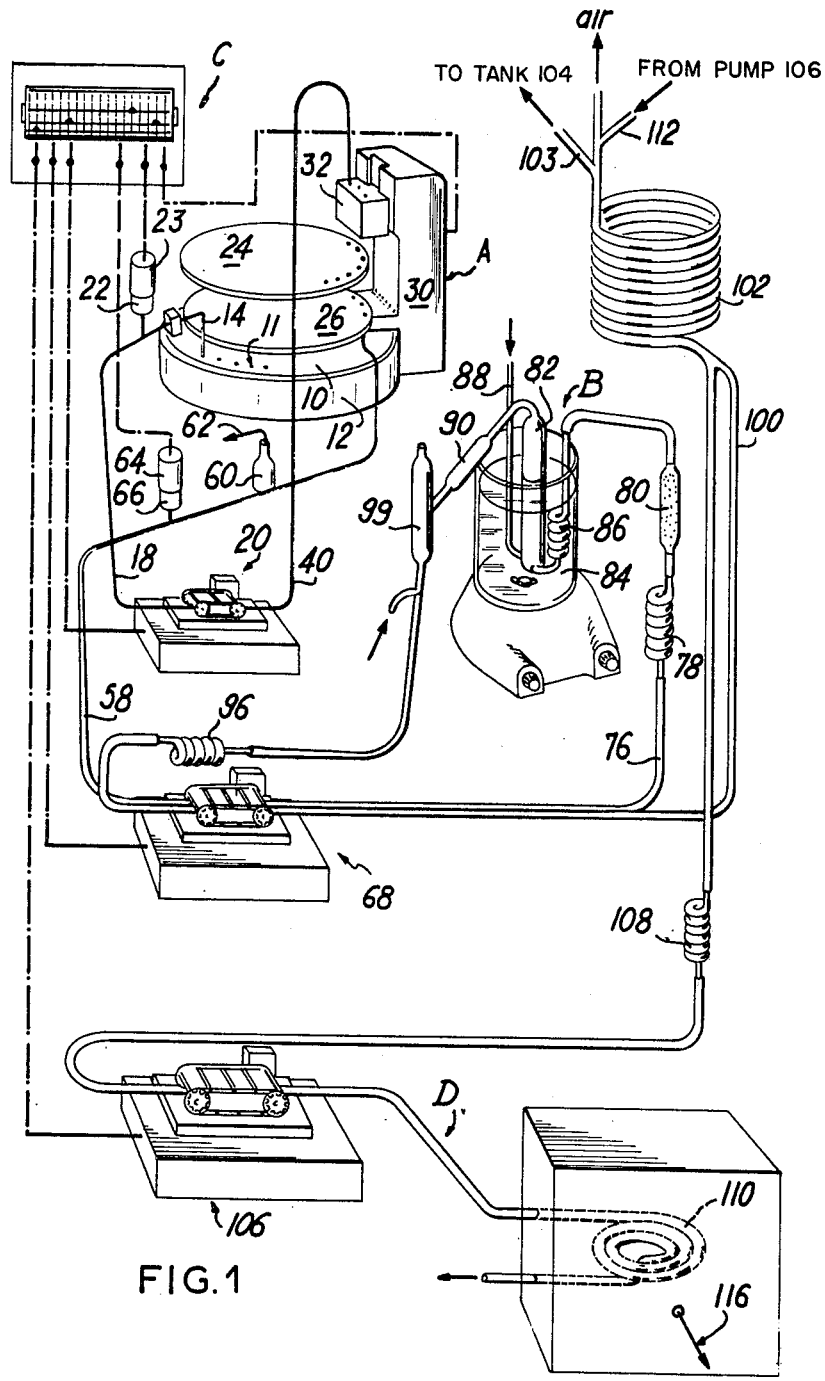

The present invention relates to a method of activation analysis for determining trace constituents of a sample containing other potentially radioactive elements as well as a device for the operation of said method or a like method.

Quantitative analysis by radioactivation is a technique which has rapidly come into widespread use for detecting elements which are present in samples in very small quantities. It is known that this method consists in irradiating the sample in a neutron flux in order to transform the element to be detected into a radioactive element having a well-determined emission characteristic. The sample is then brought in front of a selective counter for recording the emission of the activated element, thereby making it possible to determine the presence and concentration of said element.

The method is of particular interest for measuring the concentration of iodine in biological liquids. Such determinations are of great value as an aid to the understanding of the thyroid hormone metabolism and the number of successive measurements which are entailed in studies of this kind is sufficiently large to justify the development of a method which can be carried into effect in an automatic apparatus. Moreover, when radioactivation techniques are used to measure trace elements such as iodine in biological media, a chemical treatment is always necessary in order to eliminate the basic inorganic elements of the biological matrix, mainly chlorine and sodium, which are also activated during irradiation and the subsequent emission of which completely masks that of the iodine.

It has proved possible to dispense with the mineralization stage which is essential in methods of chemical analysis for the purpose of breaking the bonds between iodine and the organic molecules with which it is linked in biological liquids. In fact, during neutron irradiation, the iodine is liberated from its organic compounds in a form in which it can be fixed by anion resins.

The method according to the invention consists, after activation of the element to be determined by irradiation of the sample containing said element in a neutron flux, in diluting said element with its inactive isotope and isolating it in a continuous manner, in then storing a purified solution of said element in a measuring loop, in maintaining said element in said loop for a sufficient period of time to obtain an accurate measurement and in discharging said element prior to admission of the following sample.

In the particular case of determination of the proportion of iodine contained in organic liquids, irradiation gives rise to iodine-128 which constitutes a short-lived $\beta$ and $\gamma$ ray emitter. In this case, the purification of the sample for the purpose of isolating the iodine consists in the fixation of halogens (iodine, bromine and chlorine) by continuously passing the sample through an anion resin bed, in eliminating the chlorine and bromine by a first elution of the resin and in effecting a further elution for the entrainment of the iodine.

In its application to the determination of iodine in a sample of organic liquid, the method consists, after activation of the iodine by irradiation of the sample in a neutron flux, in diluting the iodine with its inactive isotope, in isolating said iodine by fixation on an anion resin, in eluting halogens other than iodine out of the resins and in eluting the iodine by an aqueous phase, in then storing the purified iodine solution corresponding to a sample in a measuring loop, in maintaining said solution in the loop for a sufficient period of time and in discharging said solution prior to admission of the solution which corresponds to the following sample and which is separated from the first by a washing-solution buffer.

In the application referred to above, the method can include the additional steps of oxidizing iodine to the valency of 0, of dissolving the iodine in an organic solvent such as carbon tetrachloride having a boiling temperature lower than that of water, and of fractional distillation of an emulsion of said solution and of an aqueous phase, of carrying away impurities and of reducing the iodine to the valency of $-1$ prior to storage in the measuring loop.

The device in accordance with the invention comprises a switching and separating system which consists of a plurality of columns and whereby each column which is charged with a means for retaining said element is brought in turn opposite to one of a plurality of nozzles, means whereby said sample which has been subjected to neutron irradiation is fed to the column through the first nozzle, means for supplying the second nozzle with a solution for eluting activatable elements other than the element to be detected, means for supplying a third nozzle with a solution for eluting the element to be detected, means for collecting said eluted solution which is charged with said element and for transferring said solution to an apparatus for storage and measurement of activity.

Figure 2:
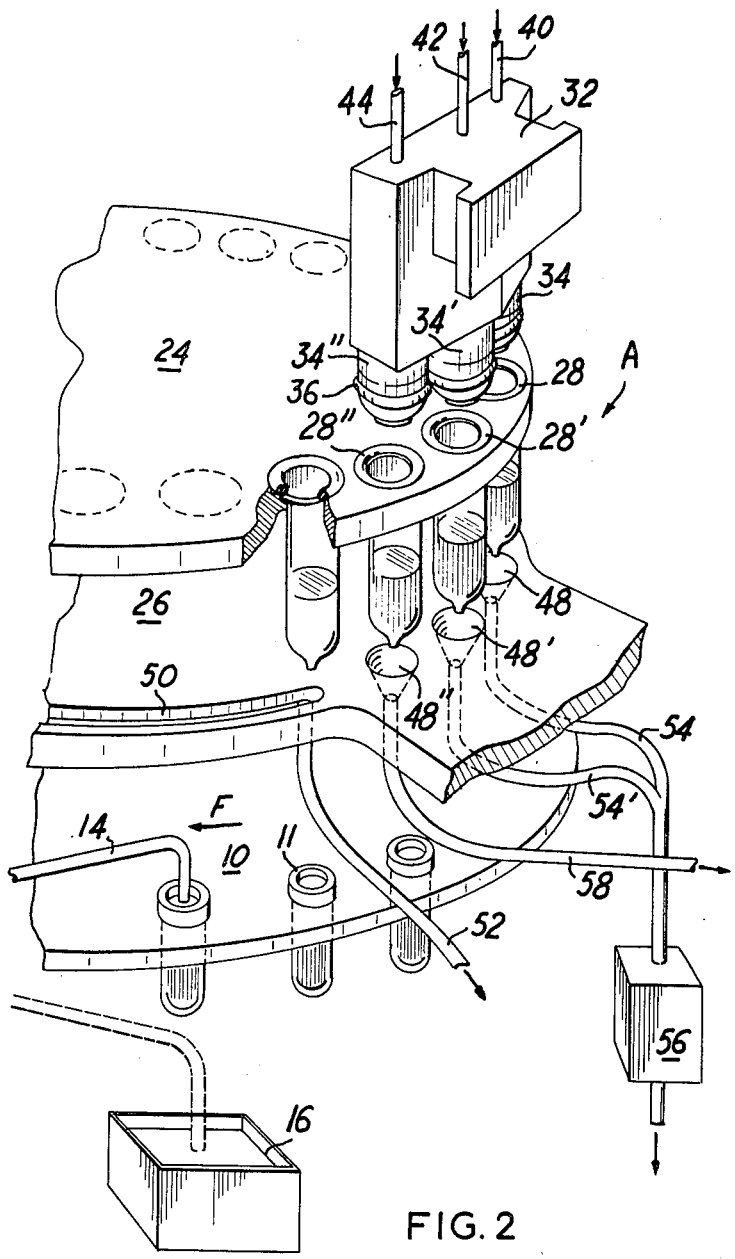
Figure 3:
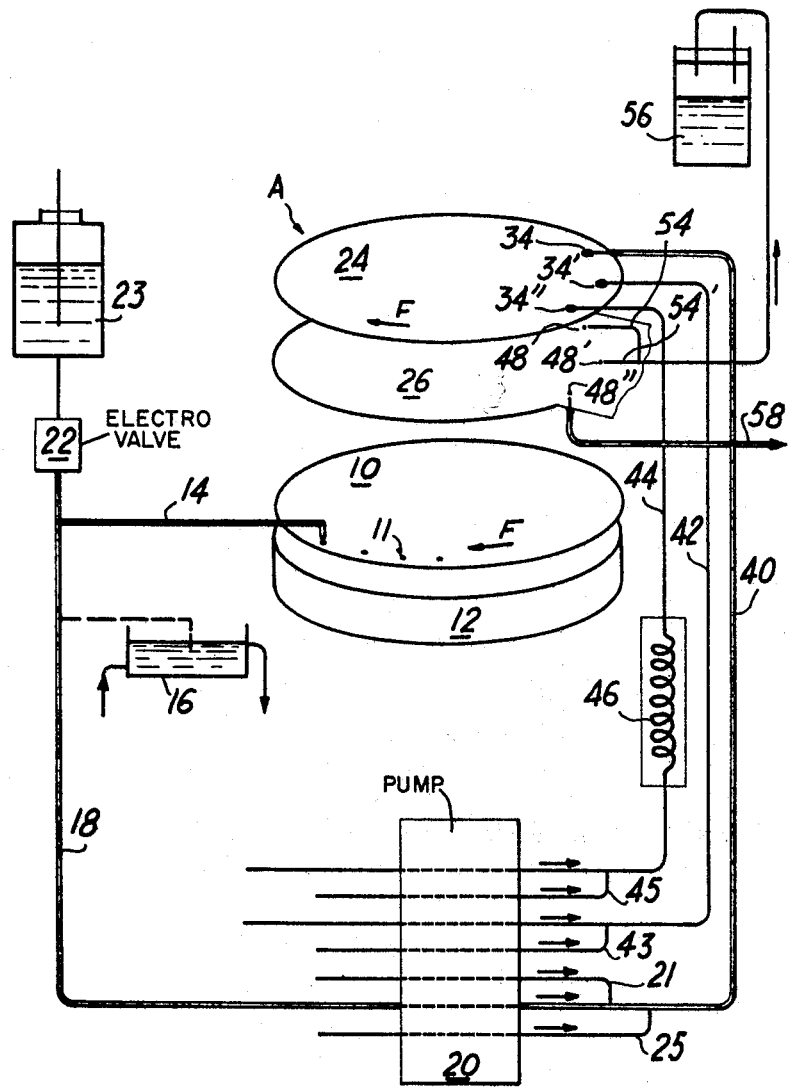
Figure 4:
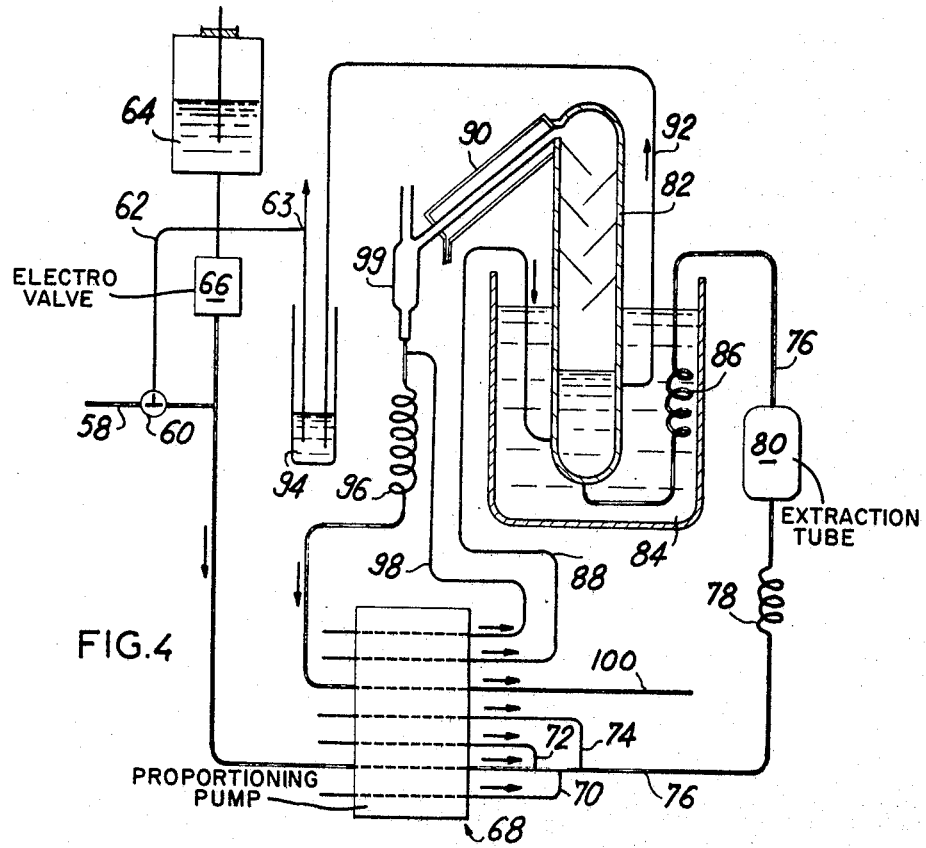
Figure 5:
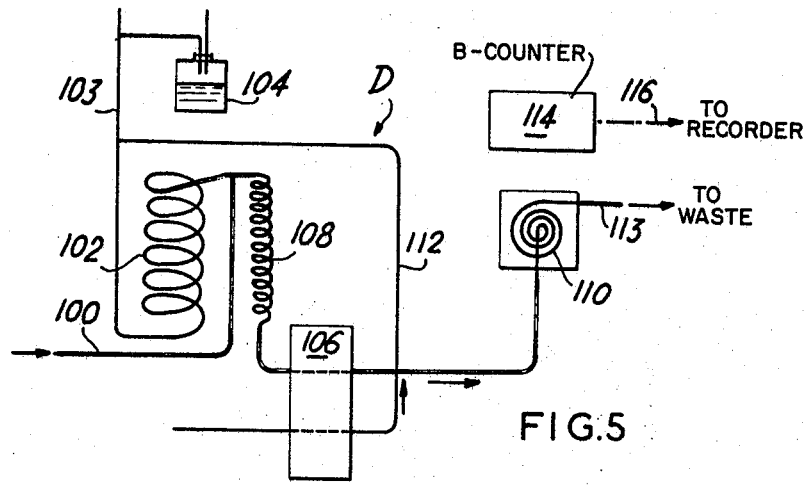
Figure 6:
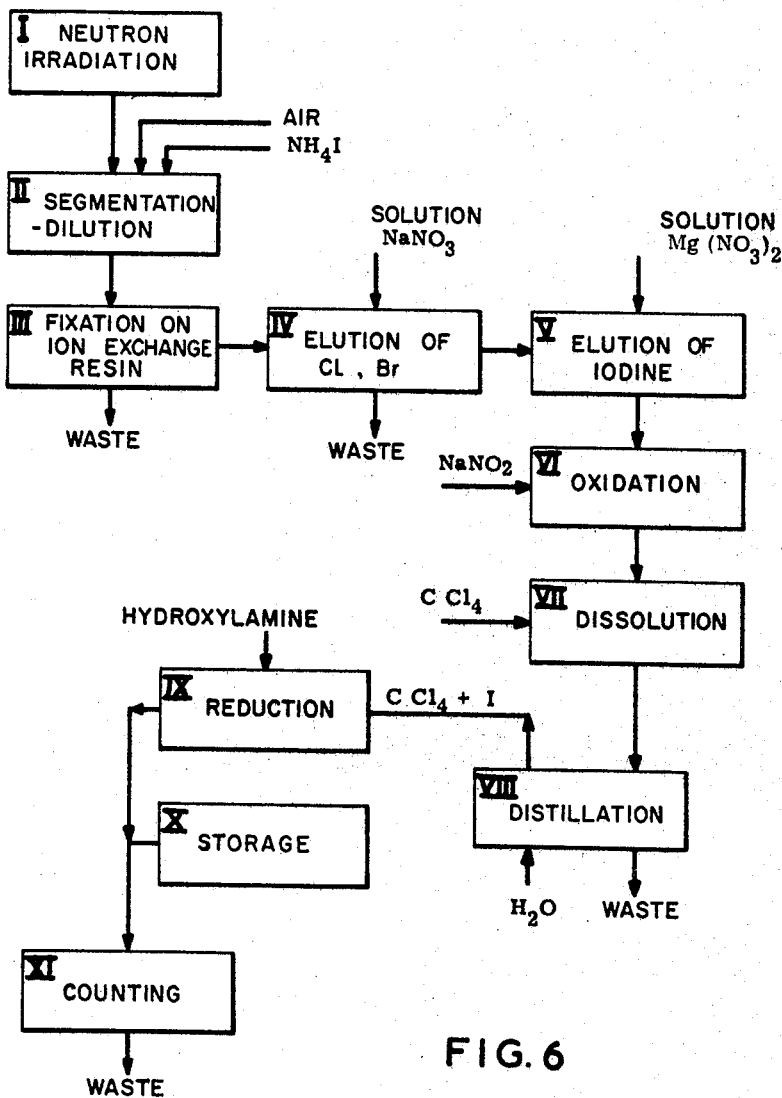

The invention also consists of other arrangements which are advantageously employed in conjunction with the preceding but which can also be employed independently thereof. All of these arrangements will become more readily apparent from a perusal of the following description of one mode of application which is given by way of example only and not in any limiting sense. Reference is made in the description to the accompanying drawings, in which:

FIG. 1 is a diagrammattic view in perspective showing the different components of the device:
FIG. 2 is a detail view of FIG. 1;
FIGS. 3, 4 and 5 show diagrammatically the principle of operation of a number of different components;
FIG. 6 is a flowsheet in which the successive steps of the process are represented diagrammatically.

The device in accordance with the invention, as shown in FIGS. 1 to 5 and described hereinafter by way of example, is intended for the quantity determination of iodine-128 which is present in a sample consisting, for example, of blood serum which also contains other radioactive elements such as, in particular, bromine, chlorine and sodium and the activity of which is considerably higher than that of iodine. For the sake of enhanced clarity, the circuit through which iodine flows is shown in double lines in the diagrams of FIGS. 3 to 5 whilst the auxiliary circuits are shown in thin lines and the control circuits are shown in broken lines.

The device is made up of a number of serially disposed units which will be described in turn. The first of these units is a sampling and separating apparatus A, as shown in FIGS. 1, 2 and 3. That portion of this apparatus which constitutes the sampling section consists of a turntable distributor 10 or rotating rack in which are formed uniformly spaced recesses for accommodating sampling flasks such as the flask 11; the turntable is driven in step-by-step motion by a motor 12 so that each sampling flask stops in turn in front of a feed nozzle 14. An arrangement which is not illustrated seves to move said nozzle either into a forward position (shown in full lines) in which it dips into the samplng flask which is placed opposite thereto or in a rearward position (as shown in broken lines in FIGS. 2 and 3) in which said nozzle is immersed in a washing bath 16.

A pipe 18 serves to connect the nozzle to a proportioning pump 20 for feeding the separation unit of the apparatus. By means of a pipe which is fitted with an electrovalve 22 and branched onto said pipe 18 between the nozzle and the pump 20, the pipe 18 is supplied by gravity-feed from a tank 23 (shown in FIGS. 1 and 3) with a washing solution (an aqueous solution of sodium nitrate), the purpose of which will be brought out by the description which is given later in reference to the principle of operation of the apparatus.

The pump 20 is additionally intended to introduce air bubbles into the pipe 18 via a tube 21 so as to result in break-up of the sampling flow and to introduce an ammonium iodide solution via a tube 25 so as to produce an increase in the concentration of iodine I ions (FIG. 3).

The separation unit which operates on the principle of ion exchange on resin consists of a second turntable 24 which is coupled to the turntable 10 and mounted on the same base 26. The turntable 24 is fitted with a number of small columns 28, 28', 28'', etc., which is equal to the number of recesses of the turntable 10 (forty, for example). Each of these small vertical columns is open at both ends and contains a few millimeters of anion exchange resin.

A support 30 which is integral with the base 26 carries an electromagnet for controlling the vertical displacement of a switching unit 32. Said switching unit comprises three ground cones 34, 34', 34'' (as shown in FIG. 2) which, in the bottom position of the switching unit, are brought to bear on the top ends of the small columns 28, 28' and 28'' which are in oppositely-facing relation therewith, leak-tightness being ensured by means of seals such as the seal 36.

The ground cone 34 is connected to a pipe 40 extending from the proportioning pump 20 (as shown in FIGS. 1, 2 and 3); a pipe 42 is fitted with an electrovalve (not shown) which operates in combination with the proportioning pump 20 and serves to connect the ground cone 34' to a source of supply of aqueous solution of sodium nitrate (which can be supplied either by gravity or by means of the pump 20). Finally, the ground cone 34'' is connected to a pipe 44 for supplying an aqueous solution of magnesium nitrate. Break-up of the solutions supplied is achieved by means of air bubbles derived from the tubes 43 and 45 (shown in FIG. 3) and introduced by the pump 20. Provision is advantageously made in the pipe 44 for a coil 46 which serves to heat the solution to a temperature within the range of 50 to 100° C. and preferably slightly below boiling tempeature.

The base 26 is fitted with three funnels 48, 48' and 48'' for receiving the liquid which is supplied from the ground cones 34, 34' and 34'' and which has passed through the columns 28, 28' and 28''.

There is also formed in the base a groove 50 for receiving the liquid which drips from the columns after these latter have moved past the funnels. This liquid is then discharged to waste through a pipe 52 (shown in FIG. 2).

During the step-by-step rotation of the turntable 24, each column takes up in turn the three positions indicated by the references 28, 28' and 28'' in FIG. 2, namely opposite to the cones 34, 34' and 34'' and to the funnels 48, 48' and 48''. The first funnel 48 which is placed opposite to the cone 34 is connected by means of a pipe 54 to a storage tank 56 (as shown in FIG. 2). Thus, the sample to be analyzed passes from the pipe 40 to the pipe 54 and through the anion resin which only retains the halogens (iodine, bromine and a fraction of the chlorine) and permits the proteins, the sodium and even a fraction of the chlorine to pass through so as to be discharged.

The second funnel 48' is also connected by means of a pipe 54' to the storage tank 56. The sodium nitrate solution which passes from the pipe 42 to the pipe 54' during the second stage and passes through the resin completes the elimination of the chlorine and carries away the bromine. Finally, during the third stage, the eluting solution consisitng of an aqueous solution of hot magnesium nitrate passes from the cone 34'' to the funnel 48'' and entrains the iodine. The charged solution is conveyed through a pipe 58 towards the extraction-distillation apparatus B which will now be described.

Each operation which has just been described is carried out in a continuous manner and there only remains a discontinuity between the sample-taking and elution operations since it is necessary to interrupt the passage of the liquid in order to lift the cones and to rotate the turntables 10 and 24 which carry the tubes 11 and the columns 28. A programmer C (shown in FIG. 1) which is of conventional type and comprises a number of independent circuits is employed for the purpose of producing discontinuous operation and operating the electrovalves for admitting the different liquids, as will become apparent hereinafter from the description of the operation.

The liquid which results from the previous treatment is already constituted by a pure aqueous solution and the radioactivity of the iodine-128 could be measured directly by γ-spectrometry. The device in accordance with the invention further improves the purification in order to permit of β-measurement which, in the case of iodine-128, results in increased sensitivity.

The samples of aqueous solution which are conveyed through the pipe 58 (FIGS. 1, 2 and 3) mainly contain magnesium iodide and a few traces of chlorine, bromine and sodium. There are successively performed in the apparatus B the oxidizing of iodine in a nitric acid medium (transition of the iodine from a valence of −1 to the valence 0), the extraction of iodine by dissolving in carbon tetrachloride and its purification by fractional distillation: this solution has been considered preferable to that which consists in decantation and separation of the tetrachloride solution since it increases the iodine yield.

The extraction-distillation apparatus B which is illustrated diagrammatically in FIG. 4 and shown in FIG. 1 is fed via the pipe 58 in which is inserted an ampoule 60 for removing air bubbles. A vacuum line 62 is connected at one end to said ampoule and at the other end to a water pump 63 so as to establish a reduced pressure which is not sufficient to draw up the iodine-charged aqueous solution but which, on the other hand, is sufficient to draw up a liquid rinse solution which circulates in countercurrent flow at high pressure, as will be explained hereinafter.

Downstream of the ampoule 60, a gravity-feed tank 64 is connected to the pipe 58 and serves to supply an aqueous solution of ammonium iodide to the pipe 58 through an electrovalve 66 for the purpose of rinsing the pipes. A proportioning pump 68 produces successively within the pipe 58 the addition of an aqueous solution of an oxidizing agent (oxidation of the I⁻ anions to the valence 0) consisting of an aqueous solution of sodium nitrite fed through a pipe 70 (as shown in FIG. 4), the injection of dividing air bubbles through a tube 72 and finally, the addition of an organic solvent consisting of carbon tetrachloride which is supplied through a tube 74.

The mixture which is thus formed is delivered after division or break-up by the air bubbles into a pipe 76 in which are disposed a mixer consisting of a coil 78 and an extraction tube 80 containing glass beads; within said tube 80 which is filled with glass beads, the iodine, whether activated or not, is extracted almost completely by the carbon tetrachloride.

The emulsion constituted by the aqueous phase which is depleted in iodine and the organic iodine solution reaches the distillation column 82. The bottom of this column 82 is placed in a water bath 84 which maintains said column at a temperature of the order of 90° C. The emulsion of charged organic solution and depleted aqueous phase reaches the bottom of the distillation column 82 through the pipe 76 which is fitted with a coil 86 placed in the water bath 84 at 90° C.

The pump 68 also feeds the bottom of the distillation column 82 with washing water through a pipe 88 (shown in FIG. 4). The carbon tetrachloride which is vaporized in the coil 86 bubbles through the water which is supplied through the pipe 88 and passes out at the top of the column 82, thereby entraining the iodine but leaving residual impurities. The carbon tetrachloride which entrains the iodine, whether this latter is activated or not, then condenses in a cooler 90 whilst the washing water which is still in liquid phase passes out through a pipe 92 and returns to a tank 94 from which it is then sucked by the water pump.

The iodine solution having zero valence in carbon tetrachloride receives from the pump 68 at the outlet of the cooler 90 a reducing solution consisting, for example, of an ammoniacal solution of hydroxylamine which is fed in through a pipe 98. There is advantageously disposed between the cooler 90 and the connection with the pipe 98 an ampoule 99 provided with an orifice which can be closed off so as to prime the entire circuit, thus constituting a siphon.

The iodine solution and the ammonia solution are mixed in a coil 96 in which the iodine is restored to the valence of —1. The mixture is re-circulated by the pump 68 and returned through a pipe 100 towards the storage and measuring apparatus D, shown in FIGS. 1 and 5.

The storage and measuring apparatus D is made up of two separate sections, one section being intended for storage of the mixture which corresponds to one sample whilst the other section is intended to measure the activity by maintaining this mixture for a sufficient period of time beneath a $\beta$-counter. The storage section is constituted by a coil 102 having a volume such that it can contain the entire quantity of mixture corresponding to one sample. Thus, progressively as it is fed in through the pipe 100, said mixture spreads through the coil 102 by degrees and forces back a detergent washing solution contained therein towards a discharge circuit as represented diagrammatically in FIG. 5 by a tube 103 and a tank 104 which is connected to the atmosphere.

The measuring section consists of a pump 106 of the intermittent operation type, the instantaneous flow rate of which is distinctly higher than that of the two pumps previously mentioned. At the time of operation, this pump draws the sample which is stored in the coil 102 through a coil 108 and then delivers said sample for a very short time into a spiral counter tube 110 in which it will remain for the period of time which elapses between the admission of two successive samples. While one end of the pump 106 aspirates the sample which is placed within the coil 102, the other end supplies said coil at the same time with a detergent solution at a flow rate of the same order, via a pipe 112.

The volume fo the spiral counter tube 110 and of the coil 108 is preferably greater than that of the sample so as to ensure that it can absorb not only the volume which has previously been stored in the coil 102 but also a certain additional volume of detergent solution which will serve to carry out a washing operation behind the sample when this latter is driven into a waste pipe by the following sample.

During each counting period, the mixture which corresponds to the following sample is stored in the glass coil 102: the discontinuous operation of the pump 106 as well as the starting and stopping of the counting are again initiated by the programmer C shown in FIG. 1.

The measuring section is equipped with $\beta$-counters 114 of the helium-flow type which have a low background; two counters having a large diameter are advantageously placed in oppositely facing relation on each side of the spiral counter tube 110 and mounted in parallel so as to give a counting geometry in the vicinity of $4\pi$. The spiral counter tube and the two counters, each of which is equipped with a coincidence-mounted guard counter for maximum background elimination can in addition be enclosed in a lead container. The data recorded by the scaler which is associated with the counters 114 are decoded and transmitted to a typewritter, not shown, for printing purposes.

The materials employed in the construction of the apparatus are chosen so as to endow this latter with satisfactory flexibility and sufficient resistance to corrosive reagents. It is possible in particular to make use of glass for the coils and winding tubes, polyethylene for the turntables and resin columns, polytetrafluoroethylene for the ground cones and vinyl chloride for the different tubes and pumping conduits.

Among the immediate alternative forms of embodiment of the device, one which is especially worthy of note consists in replacing the fixation of anion resin by precipitation by means of reagents on filters which are also disposed within the small columns.

By way of example of practical application of a process in accordance with the invention, there now follows a detailed description of the successive steps involved in the treatment of a sample of organic liquid such as blood serum, as shown diagrammatically in FIG. 6, for the purpose of determining the concentration of iodine contained in said sample by neutron activation.

The samples, which are five in number, are irradiated simultaneously together with a referenced sample containing 0.1 microgram of iodine-127 (operation I). During the tests performed, the samples, which are made up of 1 cm.³ of blood serum diluted in 2 cm.³ of a ¹⁄₁₀₀₀ solution of sodium pyrosulphite, are mantained for a period of 30 minutes in a thermal neutron flux of $5 \cdot 10^{12}$ neutrons/cm.²/sec.

Immediately on completion of irradiation, the samples are poured into the flasks of the sampling turntable. The sequence of treatment operations in the apparatus will commence at the instant $T_0$ in which the turntable (the cones being in their raised positions) moves round by one step and brings the flask 11 which contains the first sample opposite the sampling nozzle 14.

At the instant $T_0+8$ secs., the electromagnet of the switching unit 32 is energized and initiates the downward motion of the cones 34, 34' and 34" and brings them to bear against the tops of the columns which face opposite thereto. Said cones are preferably caused to perform two downward movements in rapid succession in order to effect a perfect seal. At the same time, the sampling nozzle 14 is moved out of the bath 16 in which it was immersed and brought into the flask of the turntable 10.

At the instant $T_0+15$ secs., the proportioning pump 20 is switched on and begins to suck the sample from the flask 11 in which the nozzle 14 is immersed. The sample which is admitted at a constant flow rate into the pipe 18 is divided up by air bubbles which are aspirated by the pump 20 at a lower flow rate (operation II). At the outlet of the pump, the sample taken is also mixed with an aqueous solution of ammonium iodide, $NH_4I$, at 0.3 mg./cm.$^3$ which is drawn through the pipe 25. The flow rates are, for example, 3.9 cm.$^3$/min. in the case of the sample taken, 0.8 cm.$^3$/min. in the case of the air and 0.6 cm.$^3$/min. in the case of the iodide solution. This mixture reaches the column 28 which is charged with anion resin such as, for example, resin which is sold in commerce under tthe trademark "Dowex 2–8" (operation III); the resin retains the entire quantity of iodine and bromine and a fraction of the chloride; the cations and in particular sodium, as well as the proteins and a fraction of the chlorine remain in solution and are removed.

At the instant $T_0+60$ secs., the sampling nozzle 14 leaves the flask 11 from which it has taken 2.75 cm.$^3$ of sample. The electrovalve 22 then opens and delivers into the pipe 18 an aqueous solution of 0.5 M sodium nitrate, $NaNO_3$. Since the volume delivered by the electrovalve is higher than the volume aspirated by the pump 20, a fraction of the solution, instead of flowing towards the pump 20, circulates in countercurrent flow through the sampling nozzle which dips into the bath 16 and rinses the nozzle, thus carrying away in particular any activated iodine which might otherwise contaminate said nozzle. In order to complete the washing process, provision is made for a continuous circulation of water through the bath 16.

At the instant $T_0+288$ secs., the pump 20 stops, the electrovalve 22 closes and the supply voltage to the electromagnet of the switching unit 32 is cut off. Thus, the device is in readiness for a new cycle whilst that cycle which has just begun as described above will continue.

At the instant $T_0+300$ secs., which will be designated hereinafter as the instant $T_1$, a further cycle commences; the turntables 10 and 24 are moved round by one step, with the result that the column which is charged with impregnated resin is located in the position 28′ beneath the ground cone 34′.

At the instant $T_1+15$ secs., operation IV (removal of chlorine and bromine) is about to begin: the pipe 42 (shown in FIGS. 2 and 3) is supplied with a 0.5 M aquous solution of sodium nitrate which is also divided up by air bubbles. This solution flows through the column in position 28′ and entrains the bromine and chlorine by selective elution (operation IV).

At the instant $T_1+300$ secs. (instant $T_2$) another cycle begins again: the column which contains the iodine-charged resin moves to position 28″.

At the instant $T_2+15$ secs., the column 28″ receives from the pump 20 via the pipe 44 a 50% magnesium nitrate solution which is heated to 95° in the winding tube 46 and also divided by air bubbles; the flow rate is, for example, 3.9 cm.$^3$/min. Since the electrovalve 66 is open and delivers at a flow rate which is higher than that of the pump 68, the eluting solution which flows down from the column 28″ through the pipe 58 and the aqueous solution of ammonium iodide in a proportion of 0.3 g./l. are aspirated by the water pump 63. In this manner, the top fraction of the eluting solution is removed since it contains practically no iodine, the iodine being concentrated at the top of the resin contained in the columns.

At the instant $T_2+45$ secs., the electrovalve 66 closes, the water pump remains in continuous operation. Since the vacuum which is produced by the water pump is insufficient to suck the eluting solution from the ampoule 60, the solution flows towards the pump 68 (operation V). The pump again divides up the solution by means of air bubbles conveyed through the tube 72, mixes said solution with the oxidizing solution which consists of a 1% solution of sodium nitrite in concentrated nitric acid diluted to one-third, and with carbon tetrachloride which is fed through the tube 74. The flow rates are, for example 1 cm.$^3$/min. in the case of the oxidizing solution and 1.5 cm.$^3$/min. in the case of the tetrachloride. The iodine ions are thus oxidized at 1° (operation VI) in the mixing coil 78 and extracted by the carbon tetrachloride (operation VII) in the extraction tube 80 which consists of a glass tube filled with glass beads approximately 1 mm. in diameter. The emulsion thus formed is heated to 95° C. in the winding tube 86 and fed to the base of the distillation column 82, in which a flow of washing water circulates continuously and is discharged by siphoning off towards the tank 94 by means of the water pump 63. This flow of water dilutes and entrains the aqueous phase from which the iodine has been extracted by the carbon tetrachloride: the carbon tetrachloride distills as it entrains the iodine and condenses (operation VIII).

The distillate, which consists of a solution of iodine in carbon tetrachloride, is mixed with a reducing solution containing 1% hydroxylamine in ammonia and is directed towards the coil 96 (shown in FIG. 4). In this coil, the iodine is once again brought back to the valence of −1 (operation IX) inasmuch as, in this form, it has a lesser tendency to adhere to the pipe walls.

At the instant $T_2+420$ secs., the entire sample is stored within the coil 102 (operation X). The high-delivery pump 106 is started up and conveys the sample towards the spiral counter tube 110 at the same time as a small fraction of the rinsing liquid which is derived from the distillation column 82. After the sample has passed through, the pump delivers a buffer of the detergent solution which is admitted through the pipe 112 at the other end of the coil.

At the instant $T_2+525$ secs., the pump 106 stops. The sample, the entire quantity of which is contained within the field of the counter as well as a small quantity of the detergent solution, ceases to flow.

At the instant $T_2+530$ secs., the measurement of $\beta$-activity of the sample contained in the spiral counter tube 110 is initiated by the programmer C.

At the instant $T_2+710$ secs., the counting is stopped by the programmer and the result which is recorded by the counters 114 is decoded, directed to the typewriter via the line 116 (FIGS. 1 and 5) and printed.

At the instant $T_2+720$ secs., the pump 106 starts up again so as to initiate another measuring cycle.

The period of time which elapses between the taking of a sample from a flask 11 and the end of the measurement of the activity of said sample is 22 minutes. This period is sufficiently short compared with the half-lives of most emitters and especially iodine-128 to retain satisfactory sensitivity. By way of example, a solution containing 0.1 $\mu$g. of iodine-127 which is irradiated for a period of 30 minutes in a flux of $5\times10^{12}$ neutrons per cm.$^2$/sec. and measured 25 minutes after completion of irradiation produces 40,000 counts in the case of a measuring time of 3 minutes. Since the background of the counter is 350 counts per 3 minutes, the quantity of iodine which doubles the background is 0.001 $\mu$g., thus ensuring satisfactory accuracy in the case of the quantities which are normally present.

It can be seen that the method ensures high radiochemical purity of the samples treated, as well as maximum sensitivity by maintaining the sample beneath the counters and high speed of operation. The device itself is sturdy, easy to manipulate and limits interference of two successive samples, especially by virtue of the extensive rinsing operations which are performed between the passage of two samples, provided that a few precautions are taken (especially the periodic replacement of the pumping tubes through which carbon tetrachloride nitric acid and reducing solutions are circulated).

It has been possible to check the radiochemical purity of samples after treatment by γ-ray spectrometry in the case of determination of iodine content in the blood serum and urine both of normal persons and those showing some disturbance of the thyroid function. No contamination by another radioelement has been detected.

Furthermore, contamination of a sample by the one preceding it as they flow through the apparatus is reduced to a minimum by virtue of the fact that air bubbles are injected along the entire path followed by the sample and especially by virtue of the fact that provision is made for a maximum number of rinsing circuits. Accordingly, under the operating conditions herein described, the fraction of a sample which contaminates the following sample is of the order of 2%. In other words, if two samples having a ratio of iodine concentrations of 1 to 5 follow each other and the leading sample is the more highly radioactive of the two, the count rate of the second sample will increase only by approximately 10%. In thyroid physiopathology, high variations of this order between the concentrations of two samples rarely occur without previous knowledge of the fact. Consequently, it is an easy matter to group samples having the same iodine content in order to prevent such interference.

It should be noted in addition that the yield determined by tests performed by adding known quantities of iodine-131 to blood serum, urine, 2% sodium hydroxide solution or distilled water is extremely constant and in the vicinity of 60%.

The invention is evidently applicable to the determination of halogens other than iodine. In particular, the apparatus which has just been described permits the determination of bromine, provided that a few reagents are changed. Among the different radioisotopes of bromine which are obtained by the reaction n, γ on natural bromine, it is known that $Br^{80}$ (having a half-life of 18 minutes) can be detected with very high sensitivity by means of its $\beta^-$ radiation, the energy of which is of the order of 2 mev. The utilization of this isotope makes it possible to adopt short times of irradiation of biological samples and thus to reduce as far as possible the formation of chlorine-38 and sodium-24. In the case of an irradiation time of 20 minutes and a chemical processing time of 25 minutes, the invention makes it possible to measure 0.001 μg. of natural bromine by following the steps described hereinafter.

The isolation of bromine by elution in a Dowex 2–X8 resin column takes into account the fact that the elution of halogens is carried out in the order $Cl^-$, $Br^-$, $I^-$. As has been seen, the separation of the iodine is carried out with ease inasmuch as the chlorine and bromine can be removed together prior to eluting the iodine. On the other hand, in the present instance, in order to collect the bromine which is eluted between the chlorine and the iodine, the elution curve must be spread to a maximum extent without thereby producing too great an increase in the volume of reagents. This result is achieved by employing columns having an internal diameter of 10 mm. and a length of 8 cm., said columns being filled with 4 $cm.^3$ of resin and permitting of an elution throughput of 3.9 $cm.^3$/min.

By successively employing a 0.1 M sodium nitrate solution for eluting the chlorine and a 6.25% magnesium nitrate solution, the bromine is eluted for a fairly short period of time and in a small volume, very good separation of the three halogens being nevertheless achieved.

Extraction and distillation of the bromine (which are preferable since contamination is always possible) are carried out by means of steps similar to those hereinabove described. The extraction is by carbon tetrachloride after oxidizing with an oxidizing agent consisting of a 0.3% solution of permanganate of potash in normal sulphuric acid.

A large number of alternative forms and applications of this invention may be contemplated and it must be understood that any variant of all or a part of the steps and arrangements hereinabove described which remain within the definition of equivalent means are covered by this patent.

What we claim is:

1. A method of radio activation analysis of a sample to determine the concentration therein of a predetermined halogen element in very low concentration with other activatable elements, the steps of isolating a predetermined halogen element from an irradiated sample as a purified solution of said element by absorbing the halogen element on an anion resin, eluting the halogens other than said predetermined halogen out of the resin and eluting said predetermined halogen by an aqueous solution, storing a volume of the purified solution corresponding to one complete sample for a predetermined period of time sufficient to obtain an accurate activity measurement, measuring the activity of the stored volume and discharging said volume prior to storing and measuring of the volume which corresponds to the following sample.

2. A method as described in claim 1, the halogen being iodine in an organic liquid, the iodine being diluted with its inactive isotope and then being absorbed on an anion resin, the halogens other than iodine being eluted out of the resins and the iodine being then eluted by an aqueous solution, the halogens other than iodine being eluted by an aqueous solution of sodium nitrate and the iodine being eluted by a solution of magnesium nitrate at a temperature between 50° C. and the boiling temperature of the solution.

3. A method as described in claim 2 including, after elution of the iodine, the steps of oxidizing the iodine to a valence of 0, extracting the iodine from the aqueous solution by an organic solvent having a boiling temperature lower than that of water, fractionally distilling an emulsion of said solvent and the aqueous solution and then reducing the iodine to a valence of $-1$ prior to storage.

4. A device for determination of radio activation of a halogen element present in a sample with other activatable elements comprising a separating device for separate extraction of a halogen element from each irradiated sample by absorption and elution, means for accumulating a volume of the elution solution corresponding to each sample in a storage tube, a loop, means for moving said volume into said loop from said tube, a counter adjacent said loop for measuring the activity of said sample while in said loop for a predetermined time and until a volume of the elution solution of the next sample accumulates in said storage tube, means for discharging the sample whose activity has been measured from said loop and for admitting the next sample to said loop, said separating device comprising a plurality of columns each containing an ion-exchange material for retaining said halogen element, a plurality of nozzles, means for moving each of said columns in turn opposite one of said nozzles, means for feeding said sample to one of said columns through a first of said nozzles, means for supplying a second of said nozzles with a solution for eluting activatable elements other than said element and means for supplying a third of said nozzles with a solution for eluting said element.

5. A device as described in claim 4 including a first pump delivering said volume of the elution solution corresponding to said sample to said storage tube at a constant flow rate, an intermittent flow second pump having a higher flow rate than the flow rate of said first pump and a programmer starting said second pump when the volume of elution solution corresponding to a complete sample is in said storage tube to transfer said sample from said storage tube to said loop.

6. A device as described in claim 4 including a first turntable, a sampling unit, a second turntable for said unit coupled to said first turntable, said columns being mounted on said first turntable for rotation therewith, flasks on said second turntable, each of said flasks containing one of the irradiated samples, a sampling nozzle movable into each of said flasks when one of said flasks is opposite thereto and means for transferring the sample in said sampling nozzle to said first of said nozzles.

7. A device as described in claim 4, the ion exchange material being an anionic resin and the solution for eluting halogens other than iodine and for eluting iodine being an aqueous solution of sodium nitrate and a magnesium nitrate solution at a temperature between 50° C. and the boiling temperature of the solution, respectively.

References Cited

UNITED STATES PATENTS

| | | |
|---|---|---|
| 2,938,119 | 5/1960 | McKay _____ 250—43.5 XR |
| 3,259,743 | 7/1966 | Pick et al. _____ 250—43.5 XR |
| 3,268,728 | 8/1966 | Stoddart et al. |
| 3,339,072 | 8/1967 | Edwards. |

ARCHIE R. BORCHELT, Primary Examiner

U.S. Cl. X.R.

250—43.5, 106